United States Patent
Kim et al.

(10) Patent No.: US 12,216,571 B2
(45) Date of Patent: *Feb. 4, 2025

(54) STORAGE DEVICE AND METHOD OF OPERATING THE SAME

(71) Applicant: SK hynix Inc., Gyeonggi-do (KR)

(72) Inventors: Byung Jun Kim, Gyeonggi-do (KR); Jea Young Zhang, Gyeonggi-do (KR); Young Kyu Jeon, Gyeonggi-do (KR); Kyoung Ku Cho, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/486,163

(22) Filed: Oct. 13, 2023

(65) Prior Publication Data
US 2024/0037023 A1 Feb. 1, 2024

Related U.S. Application Data

(63) Continuation of application No. 17/839,557, filed on Jun. 14, 2022, now Pat. No. 11,815,938.

(30) Foreign Application Priority Data

Jul. 13, 2021 (KR) .......................... 10-2021-0091834
Mar. 22, 2022 (KR) .......................... 10-2022-0035416

(51) Int. Cl.
*G06F 12/02* (2006.01)

(52) U.S. Cl.
CPC .............................. *G06F 12/0223* (2013.01)

(58) Field of Classification Search
CPC ................................................... G06F 12/0223
See application file for complete search history.

(56) References Cited

U.S. PATENT DOCUMENTS

| | | | |
|---|---|---|---|
| 11,675,709 B2* | 6/2023 | D'Eliseo | G06F 12/1009 711/103 |
| 2017/0160931 A1* | 6/2017 | Thakkar | G06F 3/0688 |
| 2017/0160932 A1* | 6/2017 | Thakkar | G06F 11/1068 |
| 2022/0083256 A1* | 3/2022 | Muthiah | G06F 3/0604 |

* cited by examiner

*Primary Examiner* — Prasith Thammavong
(74) *Attorney, Agent, or Firm* — IP & T GROUP LLP

(57) ABSTRACT

According to an embodiment of the present disclosure, a storage device may include a memory device, and a memory controller configured to receive a read command from an external host and control the memory device according to the read command, wherein the read command may include a basic header segment commonly included in commands transferred between the external host and the memory controller and including information indicating that the read command is a command for requesting data stored in the memory device, a transaction specific field including information indicating that the read command is a read command for at least two or more logical addresses, and an extra header segment including information on the at least two or more logical addresses.

20 Claims, 19 Drawing Sheets

| Basic Header Segment (61) ||||
|---|---|---|---|
| Transaction Type | Flags | LUN | Task Tag |
| Initiator ID / Command Set Type | Query Function, Task Manag. Function | Response | Status |
| Total EHS Length | Device Information | Data Segment Length ||

FIG. 6

| | Command PIU | | | |
|---|---|---|---|---|
| | 0<br>Transaction Type<br>(= xx00 0001b) | 1<br>Flags | 2<br>LUN | 3<br>Task Tag |
| Basic Header Segment | 4<br>Initiator ID \| Command Set Type | 5<br>Query Function /<br>Task Manag. Function | 6<br>Response | 7<br>Status |
| | 8<br>Total EHS Length<br>=non-zero | 9<br>Device Information | 10 (MSB)<br>Data Segment Length (0000h) | 11 (LSB) |
| Transaction Specific Fields | 12 (MSB)<br>Expected Data Transfer Length | 13 | 14 | 15 (LSB) |
| | 16<br>CDB[0] | 17<br>CDB[1] | 18<br>CDB[2] | 19<br>CDB[3] |
| | 20<br>CDB[4] | 21<br>CDB[5] | 22<br>CDB[6] | 23<br>CDB[7] |
| | 24<br>CDB[8] | 25<br>CDB[9] | 26<br>CDB[10] | 27<br>CDB[11] |
| | 28<br>CDB[12] | 29<br>CDB[13] | 30<br>CDB[14] | 31<br>CDB[15] |
| Extra Header Segment | k<br>Extra Header Segment (EHS) 1 | k+1 | k+2 | k+3 |
| | ⋮ | | | |
| | j<br>Extra Header Segment (EHS) N | j+1 | j+2 | j+3 |

FIG. 7

Read (6) Command Descriptor Block

| | | Bit | | | | | | | |
|---|---|---|---|---|---|---|---|---|---|
| | | 7 | 6 | 5 | 4 | 3 | 2 | 1 | 0 |
| Byte | 0 | OPERATION CODE (08h) ||||||||
| | 1 | Reserved (READ MODE MESSAGE) ||| (MSB) |||||
| | 2 | LOGICAL BLOCK ADDRESS (NORMAL READ MODE) ||||||||
| | 3 | ||||||| (LSB) |
| | 4 | TRANSFER LENGTH (NORMAL READ MODE) ||||||||
| | 5 | CONTROL = 00h ||||||||

FIG. 8

Read (10) Command Descriptor Block

| | | \multicolumn{8}{c}{Bit} | | | | | | | |
|---|---|---|---|---|---|---|---|---|---|
| | | 7 | 6 | 5 | 4 | 3 | 2 | 1 | 0 |
| Byte | 0 | \multicolumn{8}{c}{OPERATION CODE (28h)} | | | | | | | |
| | 1 | \multicolumn{3}{c}{RDPROTECT = 000b} | | | DPO | FUA | Reserved (READ MODE MESSAGE) | FUA_NV = 0b | Obsolete |
| | 2 | (MSB) | | | | | | | |
| | 3 | \multicolumn{8}{c}{LOGICAL BLOCK ADDRESS (NORMAL READ MODE)} | | | | | | | |
| | 4 | | | | | | | | |
| | 5 | | | | | | | | (LSB) |
| | 6 | \multicolumn{4}{c}{Reserved} | | | | | \multicolumn{4}{c}{GROUP NUMBER} | | | |
| | 7 | (MSB) | | | | | | | |
| | 8 | \multicolumn{8}{c}{TRANSFER LENGTH (NORMAL READ MODE)} | | | | | | | (LSB) |
| | 9 | \multicolumn{8}{c}{CONTROL = 00h} | | | | | | | |

FIG. 9

Read (16) Command Descriptor Block

| | | \multicolumn{8}{c}{Bit} | | | | | | | |
|---|---|---|---|---|---|---|---|---|---|
| | | 7 | 6 | 5 | 4 | 3 | 2 | 1 | 0 |
| Byte | 0 | \multicolumn{8}{c}{OPERATION CODE (88h)} | | | | | | | |
| | 1 | \multicolumn{3}{c}{RDPROTECT = 000b} | | | DPO | FUA | Reserved (READ MODE MESSAGE) | FUA_NV = 0b | Obsolete |
| | 2 | (MSB) | | | | | | | |
| | ⋮ | \multicolumn{8}{c}{LOGICAL BLOCK ADDRESS (NORMAL READ MODE)} | | | | | | | |
| | 9 | | | | | | | | (LSB) |
| | 10 | (MSB) | | | | | | | |
| | ⋮ | \multicolumn{8}{c}{TRANSFER LENGTH (NORMAL READ MODE)} | | | | | | | |
| | 13 | | | | | | | | (LSB) |
| | 14 | Reserved | Reserved | \multicolumn{6}{c}{GROUP NUMBER} | | | | | | |
| | 15 | \multicolumn{8}{c}{CONTROL = 00h} | | | | | | | |

FIG. 10A

Address for Multi Read Mode

| EHS | |
|---|---|
| LBA #1 | TRANSFER LENGTH #1 |
| LBA #2 | TRANSFER LENGTH #2 |
| LBA #3 | TRANSFER LENGTH #3 |
| LBA #4 | TRANSFER LENGTH #4 |

⋮

STORAGE DEVICE AND METHOD OF OPERATING THE SAME

CROSS-REFERENCE TO RELATED APPLICATION

The present application is a continuation of U.S. patent application Ser. No. 17/839,557 filed on Jun. 14, 2022, which claims priority under 35 U.S.C. § 119(a) to Korean patent application number 10-2021-0091834, filed on Jul. 13, 2021 and Korean patent application number 10-2022-0035416, filed on Mar. 22, 2022, the entire disclosures of which are incorporated herein by reference.

BACKGROUND

1. Field of Invention

The present disclosure relates to an electronic device, and more particularly, to a storage device and a method of operating the same.

2. Description of Related Art

A storage device is a device that stores data under control of a host device such as a computer or a smartphone. A storage device may include a memory device storing data and a memory controller controlling the memory device. The memory device may be classified into a volatile memory device and a nonvolatile memory device.

The volatile memory device may be a device that stores data only when power is supplied and loses the stored data when the power supply is cut off. The volatile memory device may include a static random access memory (SRAM), a dynamic random access memory (DRAM), and the like.

The nonvolatile memory device is a device that does not lose data even though power is cut off. The nonvolatile memory device includes a read only memory (ROM), a programmable ROM (PROM), an electrically programmable ROM (EPROM), an electrically erasable and programmable ROM (EEPROM), a flash memory, and the like.

SUMMARY

An embodiment of the present disclosure provides a storage device and a method of operating the same capable of performing a read operation on a plurality of logical addresses.

According to an embodiment of the present disclosure, a storage device may include a memory device, and a memory controller configured to receive a read command from an external host and control the memory device according to the read command, wherein the read command may include a basic header segment commonly included in commands transferred between the external host and the memory controller and including information indicating that the read command is a command for requesting data stored in the memory device, a transaction specific field including information indicating that the read command is a read command for at least two or more logical addresses, and an extra header segment including information on the at least two or more logical addresses.

According to an embodiment of the present disclosure, a method of operating a storage device including a memory device and a memory controller that controls the memory device may include receiving, from an external host, a read command including a basic header segment commonly included in commands transferred between the external host and the memory controller and including information indicating a read command for requesting data stored in the memory device, a transaction specific field including information indicating that the read command is a read command for at least two or more logical addresses, and an extra header segment including information on the at least two or more logical addresses, and performing a read operation based on the information on the at least two or more logical addresses.

According to an embodiment of the present disclosure, a memory controller that controls a memory device may include a map data storage configured to store mapping information between a logical address and a physical address of data stored in the memory device, a read request processor configured to receive a read request from an external host and obtain physical addresses corresponding to at least one or more logical addresses included in the read request, and a read operation controller configured to provide the memory device with a read command for the physical addresses corresponding to the at least one or more logical addresses, wherein the read request may include a basic header segment commonly included in requests transmitted and received between the external host and the memory controller and including information indicating that the read request is for requesting data stored in the memory device, a transaction specific field including information indicating that the read request is a read request for at least two or more logical addresses, and an extra header segment including information on the at least two or more logical addresses.

According to an embodiment of the present disclosure, an operating method of a controller, the operating method may comprises: identifying, based on a first field of a received message, the message as a read command related to logical address groups; and controlling, based on the logical address groups defined in a second field of the message, a memory device to read data from storage units that are discontinuously arranged therein and indicated by the respective logical address groups.

According to an embodiment of the present disclosure, an operating method of a host, the operating method may comprises: providing a memory system with a message for the memory system to operate in response to the message; and receiving, from the memory system and as a response to the message, data read from storage units that are discontinuously arranged within the memory system, wherein the message includes: a first field indicating the message as a read command related to logical address groups, and a second field defining the logical address groups indicating the respective storage units.

The present technology provides a storage device and a method of operating the same capable of performing a read operation on a plurality of logical addresses.

BRIEF DESCRIPTION OF THE DRAWINGS

FIG. 6 is a diagram illustrating a command PIU included in the command according to an embodiment of the present disclosure.

FIG. 7 is a diagram illustrating a structure of a read (6) command descriptor block according to an embodiment of the present disclosure.

FIG. 8 is a diagram illustrating a structure of a read (10) command descriptor block according to an embodiment of the present disclosure.

FIG. 9 is a diagram illustrating a structure of a read (16) command descriptor block according to an embodiment of the present disclosure.

FIG. 10A is a diagram illustrating an extra header segment according to an embodiment of the present disclosure.

FIG. 10B a diagram illustrating a command PIU to which FIG. 8 and FIG. 10A are applied as an embodiment of the present invention.

DETAILED DESCRIPTION

Specific structural or functional descriptions of embodiments according to the concept which are disclosed in the present specification are illustrated only to describe the embodiments according to the concept of the present disclosure. The embodiments according to the concept of the present disclosure may be carried out in various forms and should not be construed as being limited to the embodiments described in the present specification.

Figure 1:
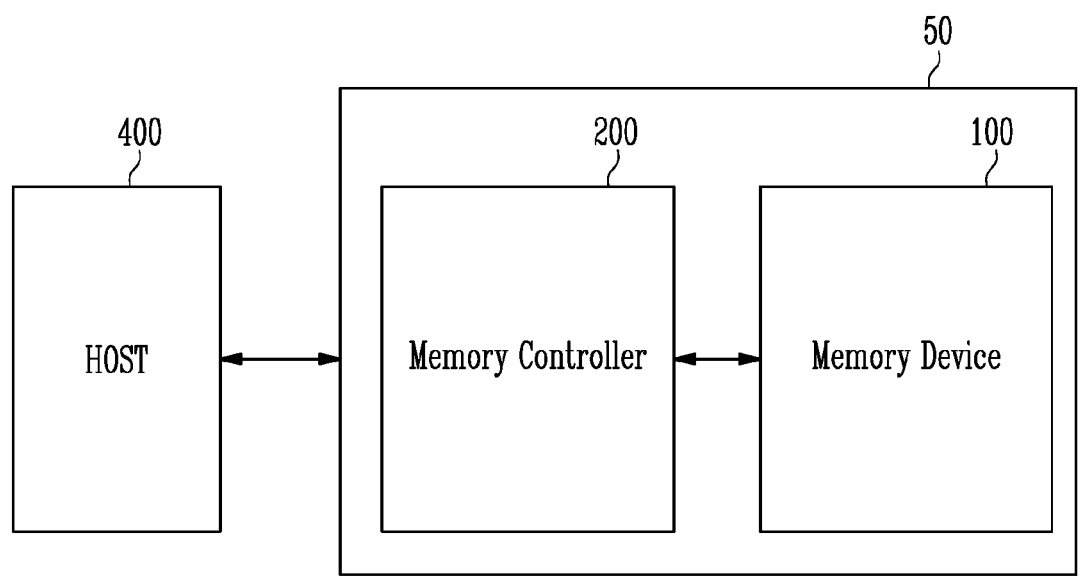
FIG. 1 is a diagram illustrating a storage device according to an embodiment of the present disclosure.

FIG. 1 is a diagram illustrating a storage device according to an embodiment of the present disclosure.

Referring to FIG. 1, the storage device 50 may include a memory device 100 and a memory controller 200. The storage device 50 may be a device that stores data under control of a host 400 such as a cellular phone, a smartphone, an MP3 player, a laptop computer, a desktop computer, a game player, a TV, a tablet PC, or an in-vehicle infotainment system. Alternatively, the storage device 50 may be a device that stores data under control of the host 400 that stores high-capacity data in one place, such as a server or a data center.

The storage device 50 may be manufactured as one of various types of storage devices according to a host interface that is a communication method with the host 400. For example, the storage device 50 may be configured as any of various types of storage devices such as an SSD, a multi-media card in a form of an MMC, an eMMC, an RS-MMC and a micro-MMC, a secure digital card in a form of an SD, a mini-SD and a micro-SD, a universal serial bus (USB) storage device, a universal flash storage (UFS) device, a personal computer memory card international association (PCMCIA) card type storage device, a peripheral component interconnection (PCI) card type storage device, a PCI express (PCI-e or PCIe) card type storage device, a compact flash (CF) card, a smart media card, and a memory stick.

The storage device 50 may be manufactured as any of various types of packages. For example, the storage device 50 may be manufactured as any of various package types, such as a package on package (POP), a system in package (SIP), a system on chip (SOC), a multi-chip package (MCP), a chip on board (COB), a wafer-level fabricated package (WFP), and a wafer-level stack package (WSP).

The memory device 100 may store data. The memory device 100 operates under control of the memory controller 200. The memory device 100 may include a memory cell array (not shown) including a plurality of memory cells that store data.

Each of the memory cells may be configured as a single level cell (SLC) that stores one data bit, a multi-level cell (MLC) that stores two data bits, a triple level cell (TLC) that stores three data bits, or a quad level cell (QLC) capable of storing four data bits The memory cell array (not shown) may include a plurality of memory blocks. Each memory block may include a plurality of memory cells. Each memory block may include a plurality of pages. In an embodiment, the page may be a unit for storing data in the memory device 100 or reading data stored in the memory device 100. The memory block may be a unit for erasing data.

In an embodiment, the memory device 100 may be a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), a spin transfer torque random access memory (STT-RAM), or the like. In the present disclosure, for convenience of description, the memory device 100 is a NAND flash memory.

The memory device 100 is configured to receive a command and an address from the memory controller 200 and access an area selected by the address in the memory cell array. The memory device 100 may perform an operation instructed by the command on the area selected by the address. For example, the memory device 100 may perform a write operation (program operation), a read operation, and an erase operation. During the program operation, the memory device 100 may program data in the area selected by the address. During the read operation, the memory device 100 may read data from the area selected by the address. During the erase operation, the memory device 100 may erase data stored in the area selected by the address.

The memory controller 200 may control an overall operation of the storage device 50.

When power is applied to the storage device 50, the memory controller 200 may execute firmware (FW). When the memory device 100 is a flash memory device, the memory controller 200 may execute firmware such as a flash translation layer (FTL) for controlling communication between the host 400 and the memory device 100.

In an embodiment, the memory controller 200 may receive data and a logical block address (LBA) from the host 400 and may convert the LBA into a physical block address (PBA) indicating an address of memory cells in which data included in the memory device 100 is to be stored.

The memory controller 200 may control the memory device 100 to perform the program operation, the read operation, or the erase operation according to a request from the host 400. During the program operation, the memory controller 200 may provide a program command, the PBA, and data to the memory device 100. During the read operation, the memory controller 200 may provide a read command and the PBA to the memory device 100. During the erase operation, the memory controller 200 may provide an erase command and the PBA to the memory device 100.

At this time, in the present disclosure, information transmitted and received between the host 400 and the memory controller 200 may be referred to as a request or a command.

In addition, in the present disclosure, information provided by the memory controller 200 to the memory device 100 may be referred to as a command.

In an embodiment, the memory controller 200 may generate a command, an address, and data independently regardless of the request from the host 400 and transmit the command, the address, and the data to the memory device 100. For example, the memory controller 200 may provide the command, the address, and the data for performing the program operation, the read operation, and the erase operation accompanying in performing wear leveling, read reclaim, garbage collection, and the like, to the memory device 100.

In an embodiment, the memory controller 200 may control at least two or more memory devices 100. In this case, the memory controller 200 may control the memory devices 100 according to an interleaving method to improve operation performance. The interleaving method may be a method of controlling operations for at least two memory devices 100 to overlap with each other.

The host 400 may communicate with the storage device 50 using at least one of various communication standards or interfaces such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), a multi-media card (MMC), an embedded MMC (eMMC), a dual in-line memory module (DIMM), a registered DIMM (RDIMM), and a load reduced DIMM (LRDIMM).

Figure 2:
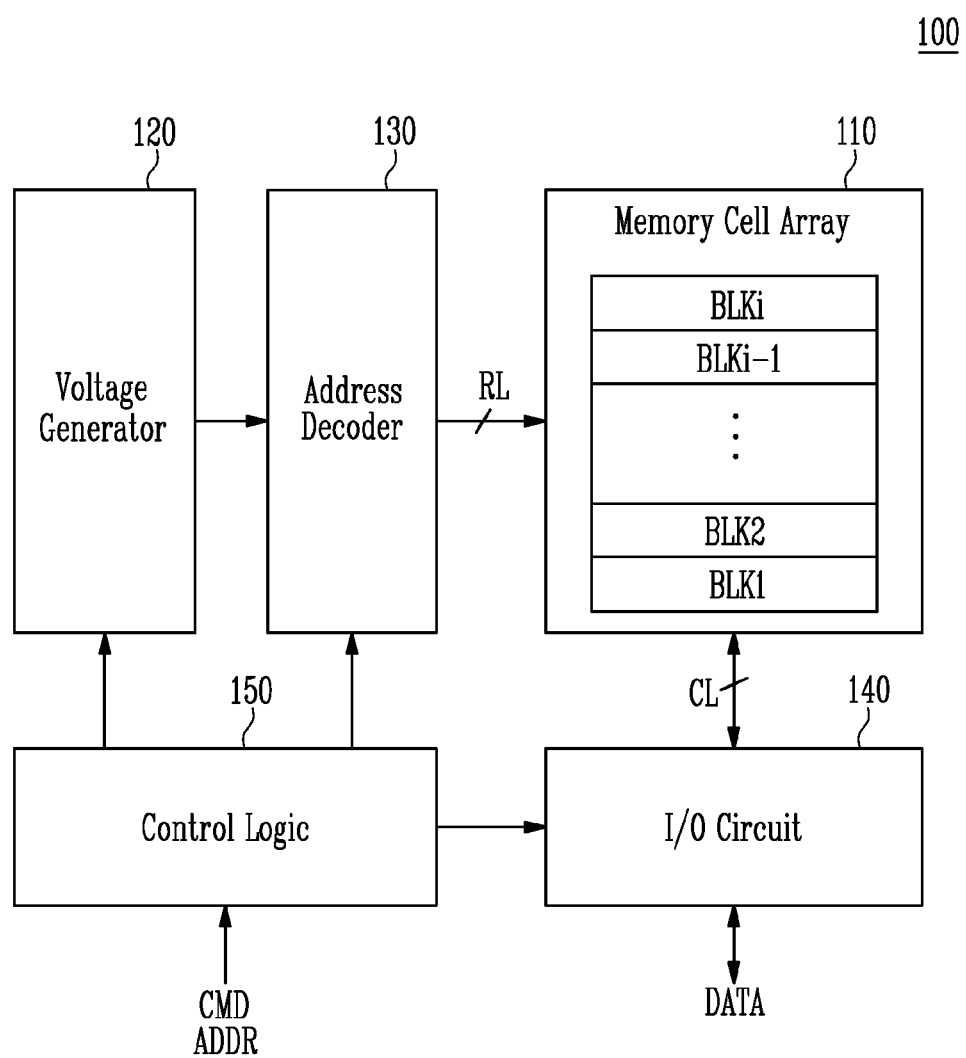
FIG. 2 is a diagram illustrating a memory device of FIG. 1 according to an embodiment of the present disclosure.

FIG. 2 is a diagram illustrating the memory device of FIG. 1 according to an embodiment of the present disclosure.

Referring to FIG. 2, the memory device 100 may include a memory cell array 110, a voltage generator 120, an address decoder 130, an input/output circuit 140, and a control logic 150.

The memory cell array 110 includes a plurality of memory blocks BLK1 to BLKi. The plurality of memory blocks BLK1 to BLKi are connected to the address decoder 130 through row lines RL. The plurality of memory blocks BLK1 to BLKi may be connected to the input/output circuit 140 through column lines CL. In an embodiment, the row lines RL may include word lines, source select lines, and drain select lines. In an embodiment, the column lines CL may include bit lines.

Each of the plurality of memory blocks BLK1 to BLKi includes a plurality of memory cells. In an embodiment, the plurality of memory cells may be nonvolatile memory cells. Memory cells connected to the same word line among the plurality of memory cells may be defined as one physical page. That is, the memory cell array 110 may include a plurality of physical pages. Each of the memory cells of the memory device 100 may be configured as a single level cell (SLC) that stores one data bit, a multi-level cell (MLC) that stores two data bits, a triple level cell (TLC) that stores three data bits, or a quad level cell (QLC) capable of storing four data bits.

In an embodiment, the voltage generator 120, the address decoder 130, and the input/output circuit 140 may be collectively referred to as a peripheral circuit. The peripheral circuit may drive the memory cell array 110 under control of the control logic 150. The peripheral circuit may drive the memory cell array 110 to perform the program operation, the read operation, and the erase operation.

The voltage generator 120 is configured to generate a plurality of operation voltages using an external power voltage supplied to the memory device 100. The voltage generator 120 operates in response to the control of the control logic 150.

In an embodiment, the voltage generator 120 may generate an internal power voltage by regulating the external power voltage. The internal power voltage generated by the voltage generator 120 is used as an operation voltage of the memory device 100.

In an embodiment, the voltage generator 120 may generate the plurality of operation voltages using an external power voltage or an internal power voltage. The voltage generator 120 may be configured to generate various voltages required in the memory device 100. For example, the voltage generator 120 may generate a plurality of erase voltages, a plurality of program voltages, a plurality of pass voltages, a plurality of selected read voltages, and a plurality of unselected read voltages.

The voltage generator 120 may include a plurality of pumping capacitors that receive the internal power voltage to generate the plurality of operation voltages having various voltage levels, and may generate the plurality of operation voltages by selectively activating the plurality of pumping capacitors in response to the control of the control logic 150.

The generated plurality of operation voltages may be supplied to the memory cell array 110 by the address decoder 130.

The address decoder 130 is connected to the memory cell array 110 through the row lines RL. The address decoder 130 is configured to operate in response to the control of the control logic 150. The address decoder 130 may receive an address ADDR from the control logic 150. The address decoder 130 may decode a block address among the received addresses ADDR. The address decoder 130 selects at least one memory block among the memory blocks BLK1 to BLKi according to the decoded block address. The address decoder 130 may decode a row address among the received addresses ADDR. The address decoder 130 may select at least one word line among word lines of a selected memory block according to the decoded row address. In an embodiment, the address decoder 130 may decode a column address among the received addresses ADDR. The address decoder 130 may connect the input/output circuit 140 and the memory cell array 110 to each other according to the decoded column address.

For example, the address decoder 130 may include components such as a row decoder, a column decoder, and an address buffer.

The input/output circuit 140 may include a plurality of page buffers. The plurality of page buffers may be connected to the memory cell array 110 through the bit lines. During the program operation, data may be stored in selected memory cells according to data stored in the plurality of page buffers.

During the read operation, the data stored in the selected memory cells may be sensed through the bit lines, and the sensed data may be stored in the page buffers.

The control logic 150 may control the address decoder 130, the voltage generator 120, and the input/output circuit 140. The control logic 150 may operate in response to the command CMD transmitted from an external device. The control logic 150 may generate control signals in response to the command CMD and the address ADDR to control the peripheral circuits.

Figure 3:
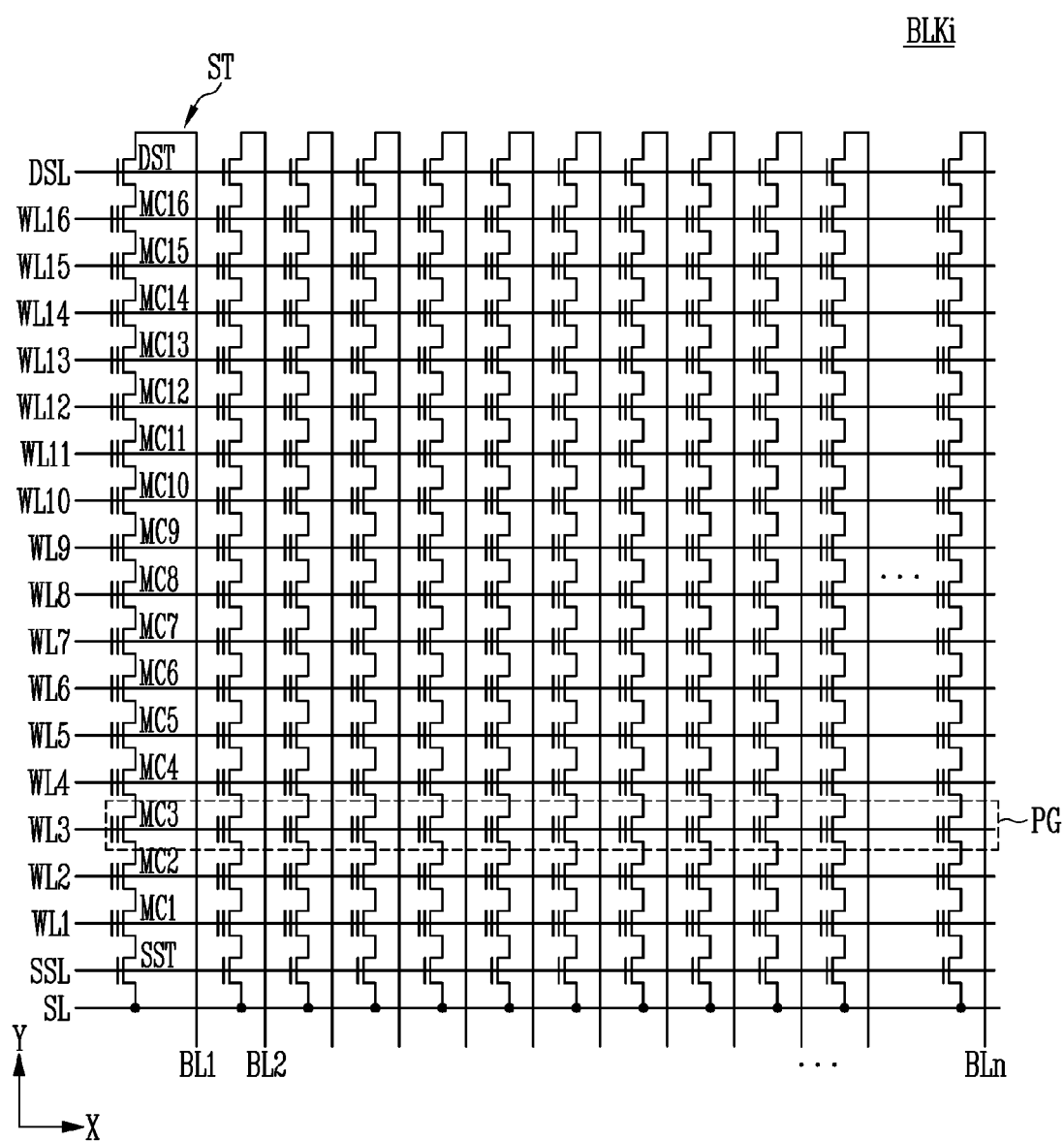
FIG. 3 is a diagram illustrating a structure of a memory block among memory blocks of FIG. 2 according to an embodiment of the present disclosure.

FIG. 3 is a diagram illustrating a structure of a memory block among the memory blocks of FIG. 2 according to an embodiment of the present disclosure.

The memory block BLKi is a memory block BLKi among the memory blocks BLK1 to BLKi of FIG. 2.

Referring to FIG. 3, a plurality of word lines arranged in parallel with each other may be connected between a first select line and a second select line. Here, the first select line may be the source select line SSL, and the second select line may be the drain select line DSL. More specifically, the memory block BLKi may include a plurality of strings ST connected between the bit lines BL1 to BLn and a source line SL. The bit lines BL1 to BLn may be connected to the strings ST, respectively, and the source line SL may be commonly connected to the strings ST. Since the strings ST may be configured to be identical to each other, a string ST connected to the first bit line BL1 is specifically described, as an example.

The string ST may include a source select transistor SST, a plurality of memory cells MC1 to MC16, and a drain select transistor DST connected in series between the source line SL and the first bit line BL1. One string ST may include at least one or more of the source select transistor SST and the drain select transistor DST, and may include a number of memory cells MC1 to MC16 which is more than the number shown in the figure.

A source of the source select transistor SST may be connected to the source line SL and a drain of the drain select transistor DST may be connected to the first bit line BL1. The memory cells MC1 to MC16 may be connected in series between the source select transistor SST and the drain select transistor DST. Gates of the source select transistors SST included in the different strings ST may be connected to the source select line SSL, gates of the drain select transistors DST may be connected to the drain select line DSL, and gates of the memory cells MC1 to MC16 may be connected to the plurality of word lines WL1 to WL16. A group of the memory cells connected to the same word line among the memory cells included in different strings ST may be referred to as a page PG. Therefore, the memory block BLKi may include a number of pages PG as the number of the word lines WL1 to WL16.

One memory cell may store one bit of data. This is commonly called a single level cell (SLC). In this case, one physical page PG may store one logical page (LPG) data. The one logical page (LPG) data may include data bits of the same number as cells included in one physical page PG.

The one memory cell may store two or more bits of data. In this case, one physical page PG may store two or more logical page (LPG) data.

Figures 4, 5:
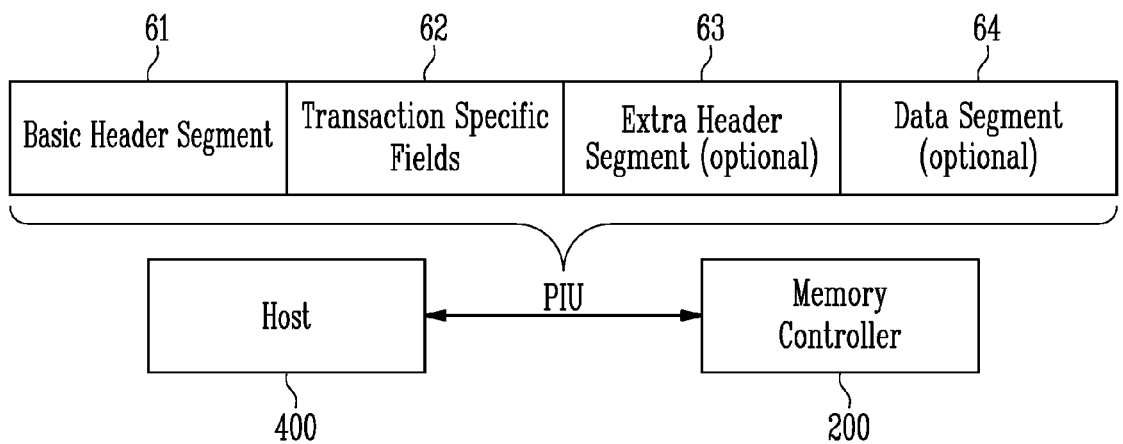
FIG. 4 is a diagram illustrating a data communication unit between a host and a memory controller according to an embodiment of the present disclosure.
FIG. 5 is a diagram illustrating a structure of a basic header segment of a protocol unit (PIU) included in a command according to an embodiment of the present disclosure.

FIG. 4 is a diagram illustrating a data communication unit between the host and the memory controller according to an embodiment of the present disclosure.

Referring to FIG. 4, the host 400 and the memory controller 200 may communicate using data packets referred to as a protocol information unit (PIU).

The PIU may include a command PIU, a response PIU, a data out PIU, a data in PIU, and a ready to transfer PIU according to an operation to be performed by the host 400 or the memory controller 200.

The command PIU may be a PIU transmitted when the host 400 transfers a command to the storage device 50.

The response PIU may be a PIU transferred when the storage device 50 provides a response to the command provided by the host 400.

The data out PIU may be a PIU transmitted when the host 400 provides data to the storage device 50.

The data in PIU may be a PIU transmitted when the storage device 50 provides data to the host 400.

The ready to transfer PIU may be a PIU transmitted when the storage device 50 informs that the storage device 50 is ready to receive the data out PIU from the host 400. The ready to transfer PIU may be transmitted when the storage device 50 has a sufficient buffer space to store data provided by the host 400.

A size of the smallest PIU may be 32 bytes, and a maximum size of the PIU may be 65600 bytes. A format of the PIU may have different sizes according to a type.

The PIU may include a basic header segment 61, a transaction specific field 62, an extra header segment 63, and a data segment 64.

The basic header segment 61 may have a size of 12 bytes. The basic header segment 61 may be commonly included in all PIUs.

The transaction specific field 62 may be included in a byte address 31 from a byte address 12 of the PIU. The transaction specific field 62 may include a dedicated transaction code according to the type of the PIU.

The extra header segment 63 may be defined when a total extra header segment length (Total EHS Length) field of the basic header segment 61 has a value other than 0. The extra header segment 63 may start from a byte address 32 of the PIU. The extra header segment 63 may be an area capable of additionally storing data when sufficient information may not be included in the basic header segment 61.

The data segment 64 may be included in the data out PIU or the data in PIU, and may not be included in other PIUs.

In an embodiment, the extra header segment 63 and the data segment 64 may not be included in all protocol PIUs, but may be included only in a specific PIU.

FIG. 5 is a diagram illustrating a structure of the basic header segment of the PIU included in the command according to an embodiment of the present disclosure.

Referring to FIG. 5, the basic header segment 61 may include a transaction type, flags, a logical unit number (LUN), a task tag, an initiator ID, a command set type, a query function/task management function (Query Function, Task Manag. Function), a response, a status, a total extra header segment length (Total EHS Length), device information, and a data segment length.

The transaction type may have a unique value according to the type of the PIU. An example of the transaction type according to the type of the PIU is shown in [Table 1] below.

TABLE 1

| When host provides to storage device | Transaction type | When storage device provides to host | Transaction type |
|---|---|---|---|
| Command PIU | 00 0001b | Response PIU | 10 0001b |
| Data out PIU | 00 0010b | Data in PIU | 10 0010b |
| X | X | Ready to transfer PIU | 11 0001b |

The flags may be fields having different values according to the transaction type. The logical unit number (LUN) may be a field indicating a number of a logical unit which performs a corresponding operation among a plurality of logical units included in an object on which an operation is to be performed.

The task tag may be a field having different values according to the transaction type.

The initiator ID may be a field identifying who is an initiator requesting an operation. Therefore, the initiator ID may have different values in a case where the host generates the PIU and the storage device generates the PIU.

The command set type may be a field included in the command PIU and the response PIU. The command set type may be a field indicating which interface a command supports, such as whether the command is an SCSI command, a UFS command, or a command defined by a manufacturer.

The query function/task management function (Query Function, Task Manag. Function) may be a field input to the PIU such as a query request, a query response, or a task management request.

The response may be a field indicating whether performance of the requested operation is successful or failed.

The status may be a field indicating an SCSI status.

The total extra header segment length (Total EHS Length) may be a field indicating a size of the extra header segment in 32 bit units. The total extra header segment length (Total EHS Length) may be used when the PIU includes an extra header segment. The length of the extra header segment may be 4 byte unit. A value of the total extra header segment length (Total EHS Length) may be a value obtained by dividing the total number of bytes of the extra header segment by 4. A maximum size of the extra header segment may be 1024 bytes. When the extra header segment is not used, the total extra header segment length (Total EHS Length) may be 0.

The device information may include information used only when performing a specific function.

The data segment length may be a field indicating a length of a data segment of the PIU. When the PIU does not include the data segment, the data segment length may be 0.

FIG. 6 is a diagram illustrating the command PIU included in the command according to an embodiment of the present disclosure.

Referring to FIGS. 5 and 6, the command (or the command PIU) may include the basic header segment, the transaction specific field, and the extra header segment.

The basic header segment may be commonly included in commands transmitted and received between the host and the memory controller. In addition, the basic header segment included in the command may include information indicating a command. For example, a basic header segment included in a read command may include information indicating a read command. That is, since a case of FIG. 6 corresponds to the command PIU included in the command, a transaction type may be 00 0001 b. In addition, according to an embodiment of the present disclosure, since the command PIU of FIG. 6 includes the extra header segment, the total extra header segment length (Total EHS Length) corresponding to a byte address 8 among fields included in the basic header segment may have a non-zero value (non-zero). For example, a value of the total extra header segment length (Total EHS Length) may be a value obtained by dividing the total number of bytes of logical block address information of an area to be read by 4 during a multi-read operation.

The transaction specific field may include a plurality of command descriptor blocks (CDBs). The CDB may include information on various commands and addresses according to a type thereof. The CDB may be a CDB based on various communication standards or interfaces such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), a multi-media card (MMC), an embedded MMC (eMMC), a dual in-line memory module (DIMM), a registered DIMM (RDIMM), and a load reduced DIMM (LRDIMM). In an embodiment, when the command of FIG. 6 is the read command, the transaction specific field of FIG. 6 may include a read CDB.

The extra header segment included in the command of FIG. 6 may include information on at least two or more logical addresses provided by the host 400.

In a case of a general read operation, that is, a normal read operation, the host 400 provides information on a start logical block address and a transfer length corresponding thereto to the memory controller 200, and thus the read operation is performed on an area up to a logical block address according to the transfer length from the start logical block address. A case where the read operation is performed on at least two or more logical addresses, that is, a case of the multi-read operation means an operation of simultaneously reading a plurality of logical addresses that are not successive to each other. Accordingly, during the multi-read operation, the information on the at least two or more logical addresses may include a plurality of start logical block addresses and information on transfer lengths respectively corresponding to the plurality of start logical block addresses. The memory controller 200 may simultaneously read the plurality of logical addresses that are not successive to each other by receiving such information from the host 400.

In an embodiment, a single piece of logical address information including the information on the start logical block address and the transfer length corresponding thereto may have a size of 8 bytes. Accordingly, in a case of the multi-read operation, the information on the at least two or more logical addresses may be set in the extra header segment sequentially by 8 bytes, but the size or setting method of the logical address information is not limited thereto.

FIGS. 7 to 9 are diagrams illustrating a read CDB according to embodiments of the present disclosure. FIGS.

7 to 9 may be a read (6) command CDB, a read (10) command CDB, and a read (16) command CDB, respectively.

Referring to FIGS. 6 to 9, the read CDB may be included in the transaction specific field of the read command. For example, the read CDB may include 0-th to ninth bytes 0 to 9. Columns of the CDB indicate each bit of each byte of the CDB. For example, each byte may include 0-th to 7th bits 0 to 7. The 0-th to seventh bits 0 to 7 of the 0-th byte 0 of the CDB indicate an operation code. For example, the operation code of the read command may be 08h (read (6) command, FIG. 7), 28h (read (10) command, FIG. 8) or 88h (read (16) command, FIG. 9).

Hereinafter, FIG. 8, which is the read CDB related to the read (10) command, is described as an example. In a case of the read (10) command, the 0-th bit 0 of the first byte 1 of the CDB may not be used (obsolete). The first bit 1 of the first byte 1 may indicate FUA_NV. The second bit 2 of the first byte 1 may be reserved. The third bit 3 of the first byte 1 may indicate force unit access (FUA). The FUA may indicate use-or-not of a data cache. The fourth bit 4 of the first byte 1 indicates a disable page out (DPO). The DPO may indicate how to set a retention priority. The fifth to seventh bits 5 to 7 of the first byte 1 may be RDPROTECT, and may have a value of '000b'. The second to fifth bytes 2 to 5 of the read (10) command CDB may indicate a logical address (LA). The logical address LA may include a most significant bit MSB to a least significant bit LSB.

The 0-th to fourth bits 0 to 4 of the sixth byte 6 of the read (10) command CDB indicate a group number. The group number may indicate a context identifier (Context ID) associated with a read request. The fifth to seventh bits 5 to 7 of the sixth byte 6 may be reserved.

The seventh and eighth bytes 7 and 8 of the read (10) command CDB indicate a transfer length. The transfer length may indicate a length of data to be read through the read request.

The ninth byte 9 of the read (10) command CDB may include control. For example, the control may be '00h'.

The read CDB may include information indicating that the read command is a read command for at least two or more logical addresses. For example, a read mode message indicating whether the read command is a multi-read command requesting a read for at least two or more logical addresses or the read command is a normal read command requesting a read for one logical address may be included. In an embodiment, the read mode message may express each read mode as a predetermined value of 0 or 1. According to the read mode message, the memory controller may perform the normal read operation or the multi-read operation.

In an embodiment, the read CDB may include the information (the read mode message) indicating whether the read command is the read command for the at least two or more logical addresses in the reserved field in the read CDB. For example, in a case of the read (10) command, the read mode message may be included in the reserved field positioned at the second bit 2 of the first byte 1 as shown in FIG. 8, but is not limited thereto, and may be included in various reserved fields in the read CDB.

When the read operation (multi-read operation) is performed on the at least two or more logical addresses according to the read mode message, the multi-read operation may be performed using logical block address information stored in the extra header segment. When the read operation (normal read operation) is performed on the one logical address according to the read mode message, the normal read operation may be performed using the logical block address information stored in the read CDB. The read CDB may include information on a start logical block address of an area to be read during the normal read operation and a transfer length corresponding to the start logical block address. However, an embodiment is not limited to only including the logical block address information related to the normal read operation in the read CDB, and the logical block address information may be stored in the extra header segment or may be stored in another field of the read command.

The contents described with reference to FIG. 8 may be modified according to a corresponding format and applied to another type of read CDB as shown in FIGS. 7 and 9.

FIG. 10A is a diagram illustrating an example of the extra header segment including the information on the at least two or more logical addresses according to an embodiment of the present disclosure.

Referring to FIG. 10A, the extra header segment may include information on a plurality of start logical block addresses (LBAs) and transfer lengths respectively corresponding to the plurality of start LBAs. For example, as shown in FIG. 10A, when LBA #1—TRANSFER LENGTH #1, LBA #2—TRANSFER LENGTH #2, LBA #3—TRANSFER LENGTH #3, LBA #4—TRANSFER LENGTH #4 are included in the extra header segment, the memory controller may simultaneously read data of an area by a length corresponding to TRANSFER LENGTH #1 from PBA #1 which is a physical block address (PBA) corresponding to LBA #1, an area by a length corresponding to TRANSFER LENGTH #2 from PBA #2, an area by a length corresponding to TRANSFER LENGTH #3 from PBA #3, and an area by a length corresponding to TRANSFER LENGTH #4 from PBA #4.

Figure 10B:
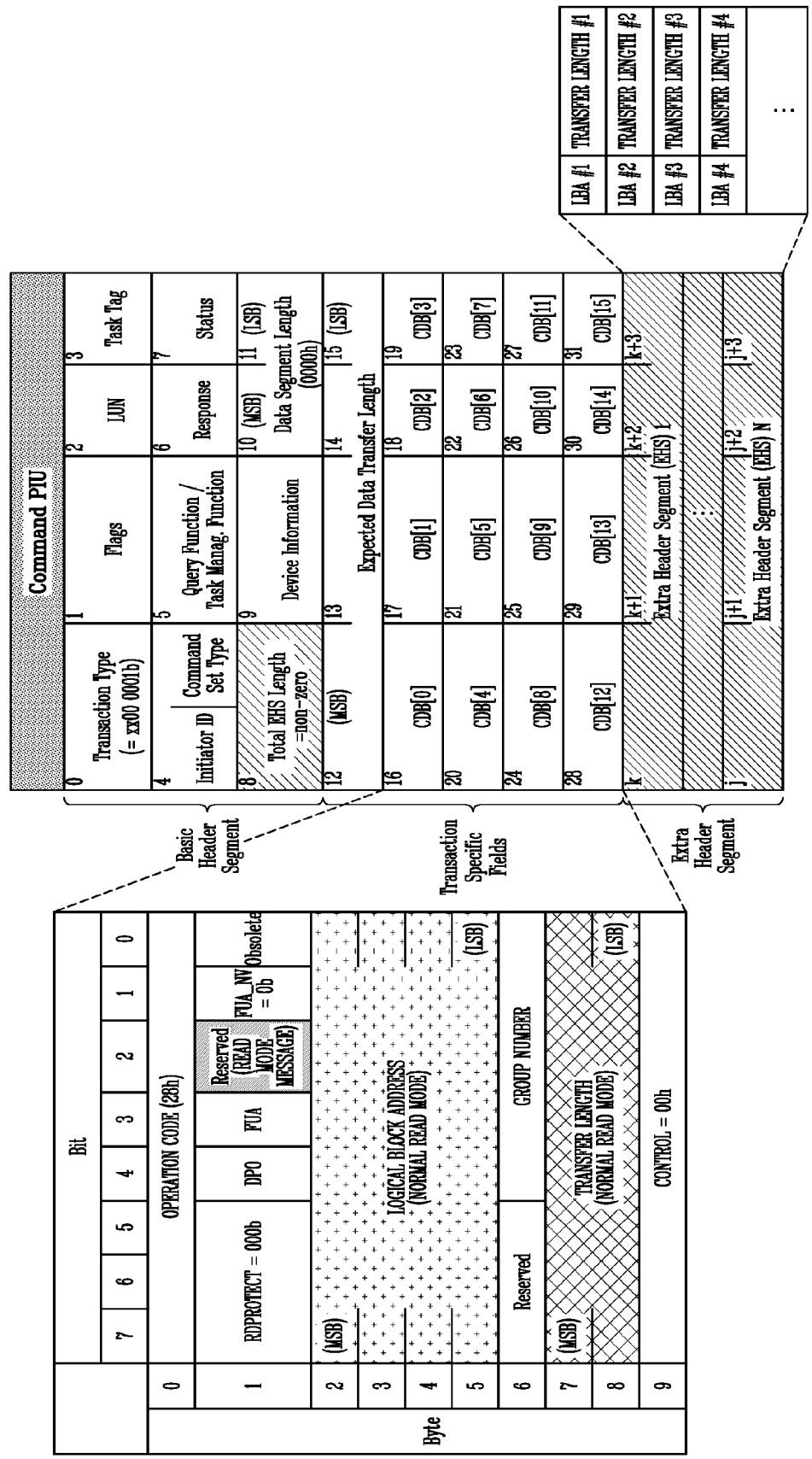

FIG. 10B is a diagram illustrating a command PIU to which FIG. 8 and FIG. 10A are applied as an embodiment of the present invention.

Referring to FIG. 8, FIG. 10A and FIG. 10B, a part of CDB[0] to CDB[15] fields included in Transaction Specific Field of Command PIU may include read CDB related to the read 10 command of FIG. 8.

Part of extra header segment of Command PIU may include information on the at least two or more logical addresses as FIG. 10A.

Figure 11:
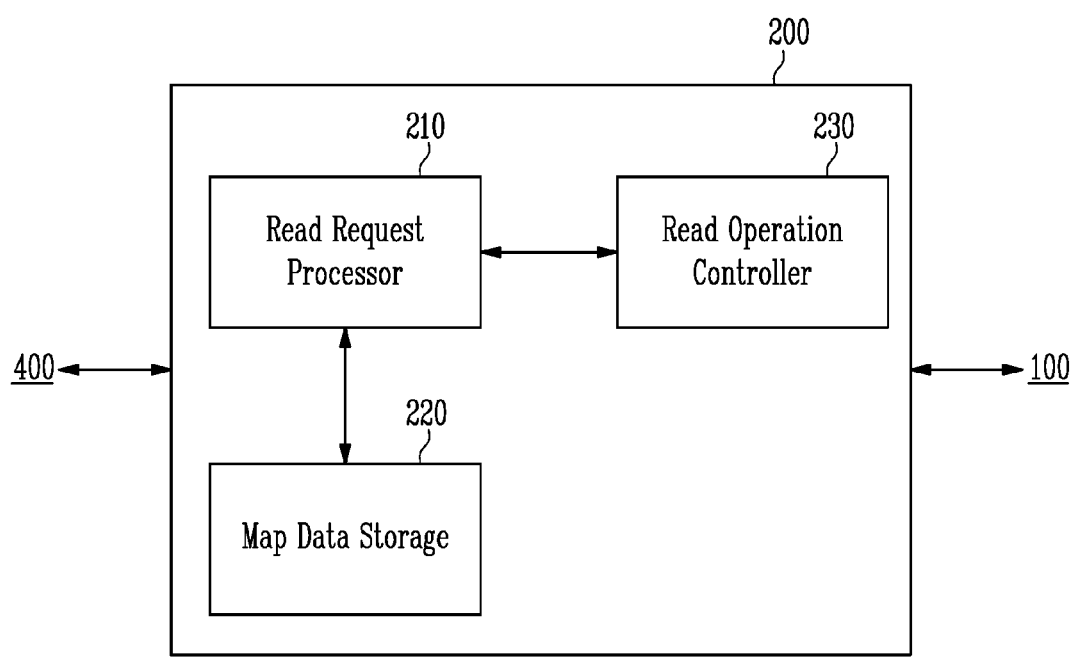
FIG. 11 is a diagram illustrating a memory controller according to an embodiment of the present disclosure.

FIG. 11 is a diagram illustrating a memory controller according to an embodiment of the present disclosure.

Referring to FIG. 11, the memory controller 200 may include a read request processor 210, a map data storage 220, and a read operation controller 230.

The memory controller 200 may receive a read request requesting to read data stored in the memory device from the host 400.

At this time, the read request may include the basic header segment, the transaction specific field, and the extra header segment.

The basic header segment may be a portion commonly included in requests transmitted and received between the external host and the memory controller, and may include the total extra header segment length (Total EHS Length) indicating the length of the extra header segment. In an embodiment, since the read request includes the extra header segment, the total extra header segment length may have a non-zero value (non-zero).

The transaction specific field may include the read command descriptor block (CDB). The information indicating whether the read request is the read request for the at least two or more logical addresses may be included in the read CDB. For example, the read mode message indicating whether the read request is the multi-read request requesting the read for the at least two logical addresses or the normal read request requesting the read for the one logical address. In an embodiment, the read mode message may express each read mode as a predetermined value of 0 or 1. According to the read mode message, the memory controller may perform the normal read operation or the multi-read operation. In an embodiment, the read CDB may include the information (the read mode message) indicating whether the read request is the read request for the at least two or more logical addresses in the reserved field in the read CDB.

The extra header segment may include the logical block address for the multi-read operation. The logical block address for the multi-read operation may include the information on the plurality of start logical block addresses and the transfer lengths respectively corresponding to the plurality of start logical block addresses.

The read request processor 210 may receive the read request from the external host and obtain the physical address corresponding to one or more logical addresses included in the read request from the map data storage 220. In addition, the read request processor 210 may check whether the read request is the read request for the at least two or more logical addresses. In an embodiment, the read request processor 210 may check the read mode message included in the read request. The read mode message indicating the information indicating whether the read request is the read request for the at least two or more logical addresses may be included in the transaction specific field, and more specifically, may be included in the reserved field in the read CDB included in the transaction specific field.

The map data storage 220 may include a logical-to-physical address mapping table configuring a mapping relationship between the logical address and the physical address. As a result of checking the read mode message of the read request processor 210, when the read request is the read request for the at least two or more logical addresses (multi-read mode), the map data storage 220 may provide map data corresponding to the two or more logical addresses included in the extra header segment of the read request to the read request processor 210. As a result of checking the read mode message of the read request processor 210, when the read request is the read request for the one logical address (normal read mode), the map data storage 220 may provide map data corresponding to the one logical address included in the read CDB in the transaction specific field of the read request to the read request processor 210. However, an embodiment is not limited to a case where the logical block address information for the normal read operation is included in the read CDB, and the logical block address information may be included in various fields in the read request including the extra header segment.

The read operation controller 230 may control the memory device to perform the read operation according to an instruction of the read request processor 210. The read request processor 210 may provide the map data received from the map data storage 220 to the read operation controller 230. The read operation controller 230 may control the memory device to perform the read operation on a corresponding address based on the map data received from the read request processor 210. In more detail, the read operation controller 230 may provide the read command for the physical address corresponding to one or more logical addresses included in the read request to the memory device.

Figure 12:
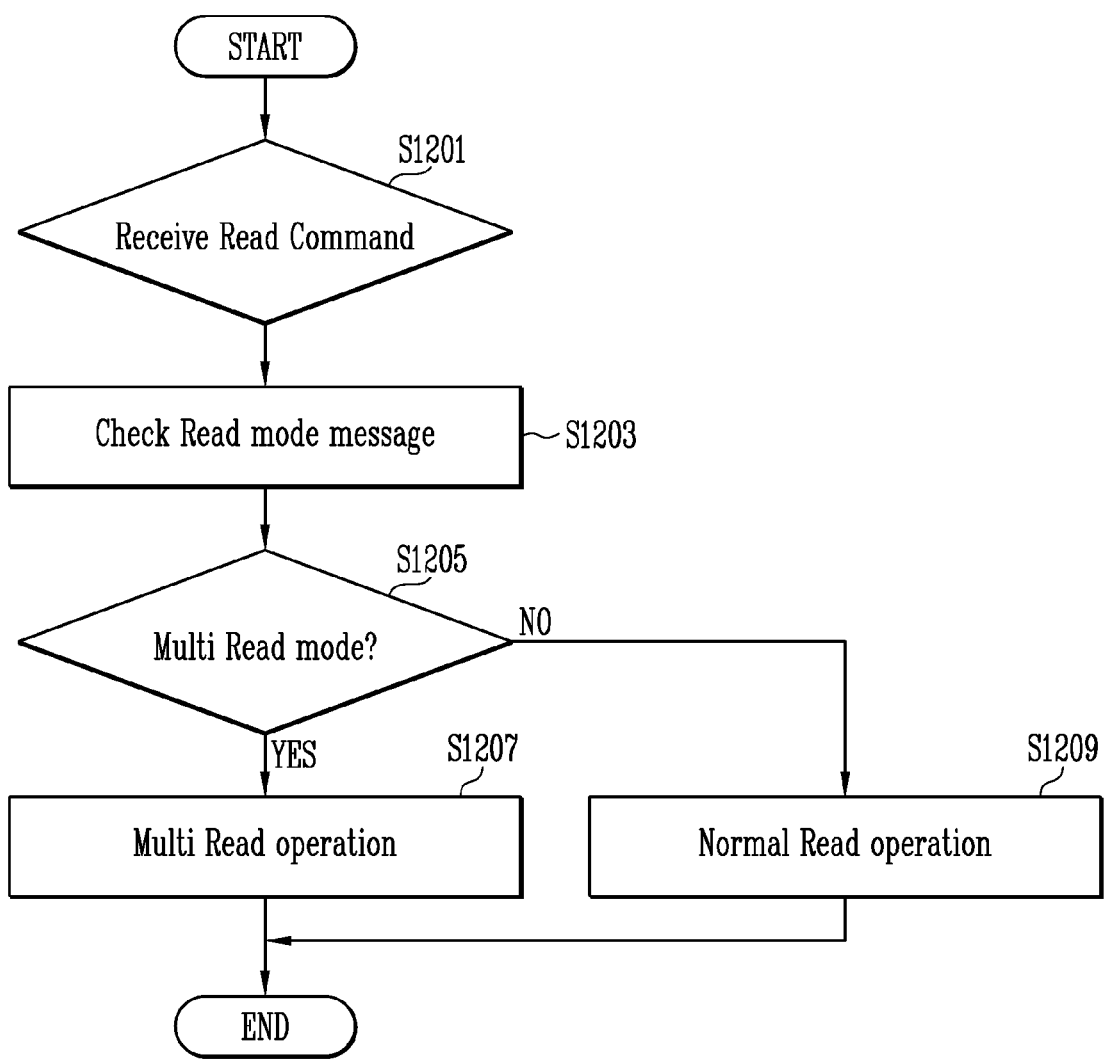
FIG. 12 is a flowchart illustrating a method of operating a storage device according to an embodiment of the present disclosure.

FIG. 12 is a flowchart illustrating a method of operating a storage device according to an embodiment of the present disclosure.

Referring to FIG. 12, in operation S1201, the storage device may receive the read command requesting to read data stored in the memory device from the external host. In more detail, the memory controller in the storage device may receive the read command.

At this time, the read command may include the basic header segment, the transaction specific field, and the extra header segment.

The basic header segment may be a portion commonly included in the commands transmitted and received between the external host and the memory controller, and may include the total extra header segment length (Total EHS Length) indicating the length of the extra header segment. In an embodiment, since the read command includes the extra header segment, the total extra header segment length may have a non-zero value (non-zero).

The transaction specific field may include the read command descriptor block (CDB). The information indicating whether the read command is the read command for the at least two or more logical addresses may be included in the read CDB. For example, the read mode message indicating whether the read command is the multi-read command requesting the read for the at least two logical addresses or the normal read command requesting the read for the one logical address. In an embodiment, the read mode message may express each read mode as a predetermined value of 0 or 1. According to the read mode message, the memory controller may perform the normal read operation or the multi-read operation. In an embodiment, the read CDB may include the information (the read mode message) indicating whether the read command is the read command for the at least two or more logical addresses in the reserved field in the read CDB.

The extra header segment may include the logical block address for the multi-read operation. The logical block address for the multi-read operation may include the information on the plurality of start logical block addresses and the transfer lengths respectively corresponding to the plurality of start logical block addresses.

In operation S1203, the storage device may check the read mode message stored in the read CDB.

In operation S1205, when the read mode message indicates the multi-read mode, that is, indicates that the read command is the read command for the at least two or more logical addresses, the multi-read operation that is the read operation for the at least two or more logical addresses of operation S1207 may be performed.

In operation S1205, when it is indicated that the read mode message is not the multi-read mode, that is, when it is indicated that the read command is not the read command for the at least two or more logical addresses, and indicates the normal read mode, the normal read operation that is the read operation for the one logical address of operation S1209 may be performed.

That is, the multi-read operation may be performed or the normal read operation may be performed instead of the multi-read operation according to the read mode message stored in the read CDB.

Figure 13:
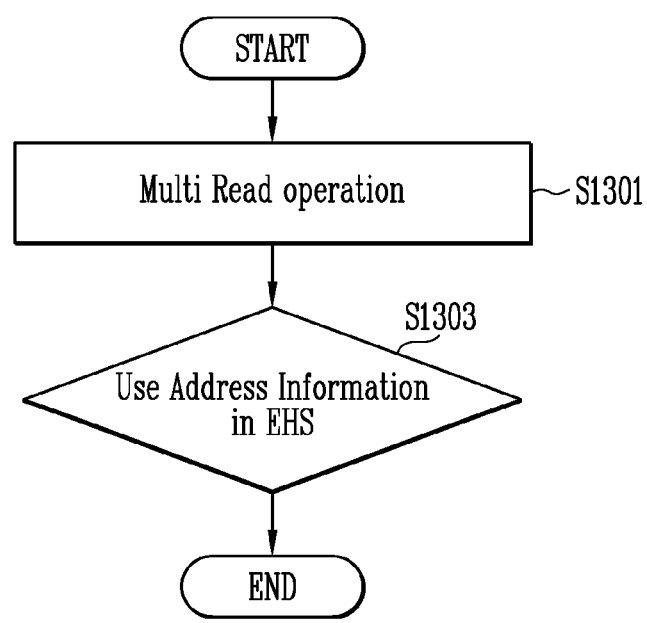
FIG. 13 is a flowchart illustrating a multi-read operation of a storage device according to an embodiment of the present disclosure.

FIG. 13 is a flowchart illustrating a multi-read operation of a storage device according to an embodiment of the present disclosure.

Referring to FIGS. 12 and 13, in operation S1301, the storage device may perform the multi-read operation according to the read mode message stored in the read CDB. In this case, in operation S1303, the multi-read operation may be performed using the information on the at least two or more logical addresses included in the extra header segment in the read command. The information on the at least two or more logical addresses included in the extra header segment may include the information on the at least two or more start logical block addresses for the multi-read operation and the transfer lengths respectively corresponding to the at least two or more start logical block addresses.

Figure 14:
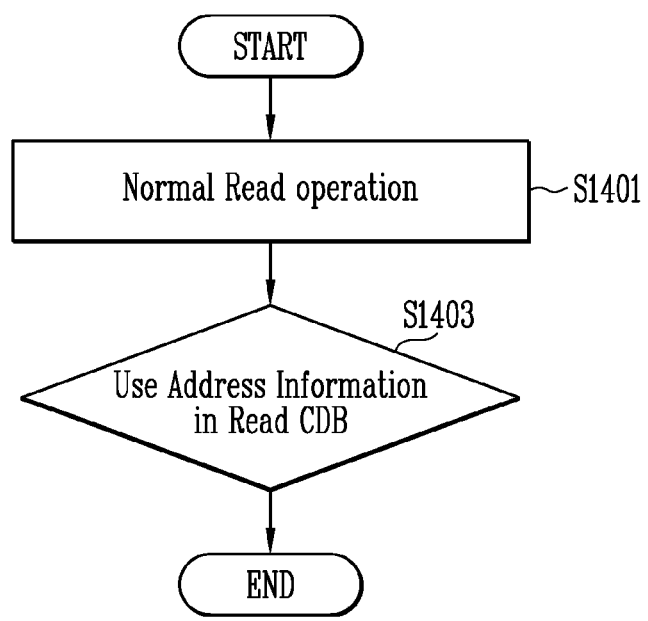
FIG. 14 is a flowchart illustrating a normal read operation of a storage device according to an embodiment of the present disclosure.

FIG. 14 is a flowchart illustrating a normal read operation of a storage device according to an embodiment of the present disclosure.

Referring to FIGS. 12 and 14, in operation S1401, the storage device may perform the normal read operation according to the read mode message stored in the read CDB. In this case, in operation S1403, the normal read operation may be performed using the transaction specific field, more specifically, the information on the one logical address included in the read CDB. The information on the logical address included in the read CDB may include the information on one start logical block address for the normal read operation and the transfer length corresponding to the one start logical block address.

However, an embodiment is not limited to a case where the logical block address information for the normal read operation is included in the read CDB, and the logical block address information may be included in various fields in the read command including the extra header segment.

Figure 15:
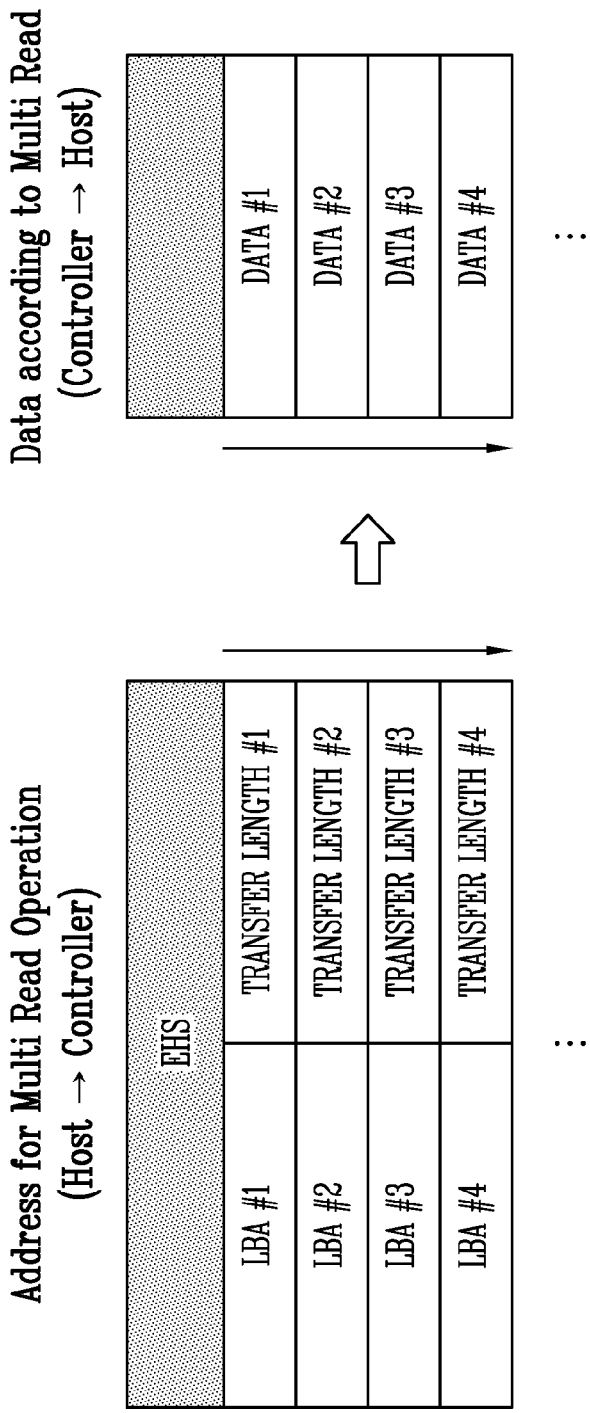
FIG. 15 is a diagram illustrating a data provision order of a storage device according to an embodiment of the present disclosure.

FIG. 15 is a diagram illustrating a data provision order of a storage device according to an embodiment of the present disclosure.

Referring to FIGS. 1, 4, and 15, the memory controller in the storage device receiving the read command requesting to read data stored in the memory device from the host may perform the read operation to provide the obtained data to the host.

When the read operation for the at least two or more logical addresses, that is, the multi-read operation is performed, data of a plurality of areas of which logical addresses are not successive may be simultaneously read and obtained. For example, as shown in FIG. 14, DATA #1 of the area corresponding to LBA #1—TRANSFER LENGTH #1 stored in the extra header segment of the read command, DATA #2 of the area corresponding to LBA #2—TRANSFER LENGTH #2, DATA #3 of the area corresponding to LBA #3—TRANSFER LENGTH #3, and DATA #4 of the area corresponding to LBA #4—TRANSFER LENGTH #4 may be simultaneously read.

At this time, the data obtained by the multi-read operation may be provided to the host according to the order of the logical block address information included in the extra header segment. For example, as shown in FIG. 12, when physical block address information in the extra header segment of the read command is described in an order of 1) LBA #1—TRANSFER LENGTH #1, 2) LBA #2—TRANSFER LENGTH #2, 3) LBA #3—TRANSFER LENGTH #3, and 4) LBA #4—TRANSFER LENGTH #4, the data may also be provided to the host in an order of 1) DATA #1, 2) DATA #2, 3) DATA #3, and 4) DATA #4. However, the data is not limited to a specific order, and the data may be provided in an order opposite to that described above. In addition, data of a plurality of areas may be provided to the host in various preset orders.

Figure 16:
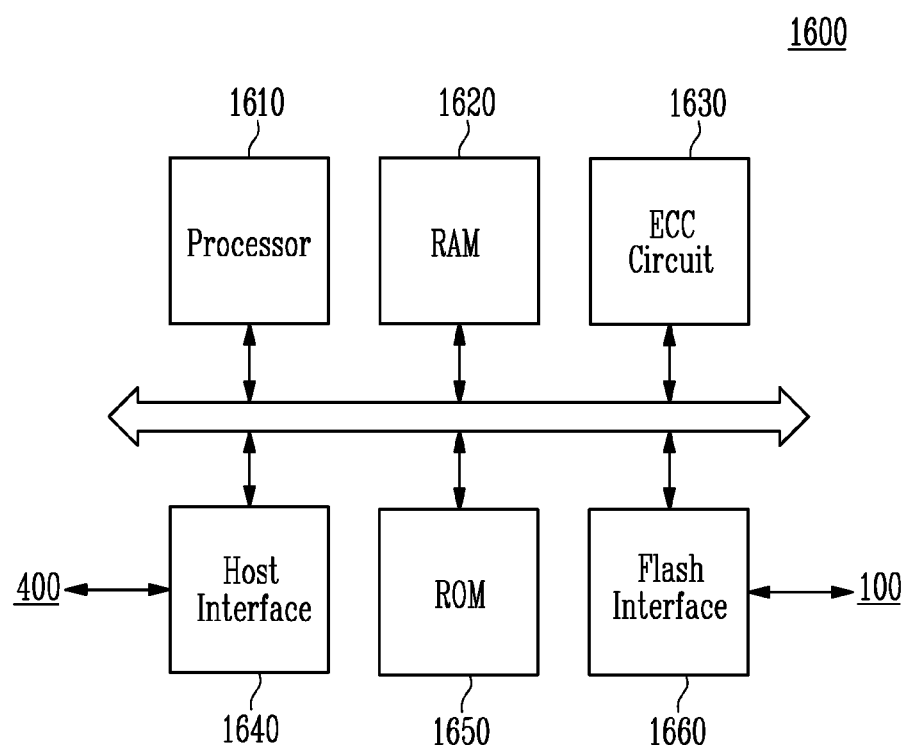
FIG. 16 is a diagram illustrating a memory controller of FIG. 1 according to an embodiment of the present disclosure.

FIG. 16 is a diagram illustrating the memory controller of FIG. 1 according to an embodiment of the present disclosure.

Referring to FIG. 16, the memory controller 1600 may include a processor 1610, a RAM 1620, an error correction circuit 1630, a host interface 1640, a ROM 1650, and a flash interface 1660.

The processor 1610 may control an overall operation of the memory controller 1600.

The RAM 1620 may be used as a buffer memory, a cache memory, an operation memory, and the like of the memory controller 1600.

The ROM 1650 may store various pieces of information required to operate the memory controller 1600 in a form of firmware.

The memory controller 1600 may communicate with an external device (for example, the host 400, an application processor, and the like) through the host interface 1640.

The memory controller 1600 may communicate with the memory device 100 through the flash interface 1660. The memory controller 1600 may transmit a command CMD, an address ADDR, a control signal CTRL, and the like to the memory device 100 and receive data DATA through the flash interface 1660. For example, the flash interface 1660 may include a NAND interface.

Figure 17:
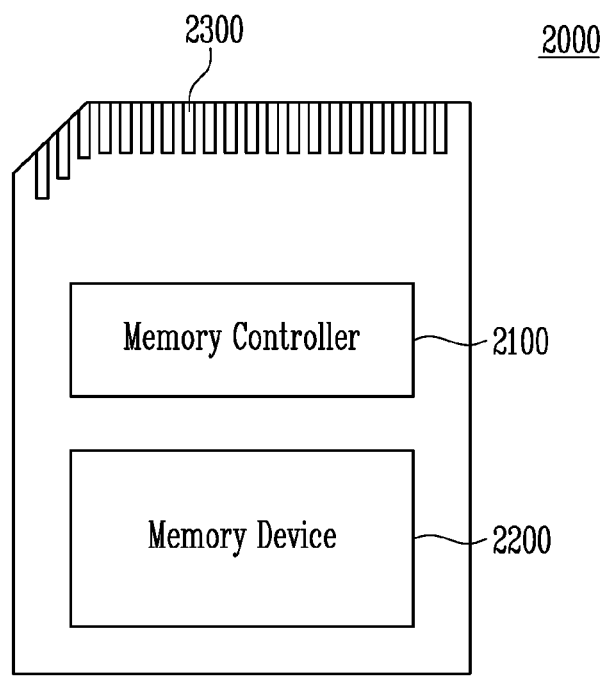
FIG. 17 is a block diagram illustrating a memory card system to which a storage device according to an embodiment of the present disclosure is applied.

FIG. 17 is a block diagram illustrating a memory card system to which a storage device according to an embodiment of the present disclosure is applied.

Referring to FIG. 17, the memory card system 2000 includes a memory controller 2100, a memory device 2200, and a connector 2300.

The memory controller 2100 is connected to the memory device 2200. The memory controller 2100 is configured to access the memory device 2200. For example, the memory controller 2100 may be configured to control read, program, erase, and background operations of the memory device 2200. The memory controller 2100 is configured to provide an interface between the memory device 2200 and a host. The memory controller 2100 is configured to drive firmware for controlling the memory device 2200. The memory controller 2100 may be implemented identically to the memory controller 200 described with reference to FIG. 1.

For example, the memory controller 2100 may include components such as a random access memory (RAM), a processor, a host interface, a memory interface, and an error corrector.

The memory controller 2100 may communicate with an external device through the connector 2300. The memory controller 2100 may communicate with an external device (for example, the host) according to a specific communication standard. For example, the memory controller 2100 is configured to communicate with an external device through at least one of various communication standards or interfaces such as a universal serial bus (USB), a multimedia card (MMC), an embedded MMC (eMMC), a peripheral component interconnection (PCI), a PCI express (PCI-e or PCIe), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe. For example, the connector 2300 may be defined by at least one of the various communication standards described above.

For example, the memory device 2200 may be configured of various nonvolatile memory elements such as an electrically erasable and programmable ROM (EEPROM), a NAND flash memory, a NOR flash memory, a phase-change RAM (PRAM), a resistive RAM (ReRAM), a ferroelectric RAM (FRAM), and a spin transfer torque-magnetic RAM (STT-MRAM).

The memory controller 2100 and the memory device 2200 may be integrated into one semiconductor device to configure a memory card. For example, the memory controller 2100 and the memory device 2200 may be integrated into one semiconductor device to configure a memory card such as a PC card (personal computer memory card international association (PCMCIA)), a compact flash card (CF), a smart media card (SM or SMC), a memory stick, a multimedia card (MMC, RS-MMC, MMCmicro, or eMMC), an SD card (SD, miniSD, microSD, or SDHC), and a universal flash storage (UFS).

Figure 18:
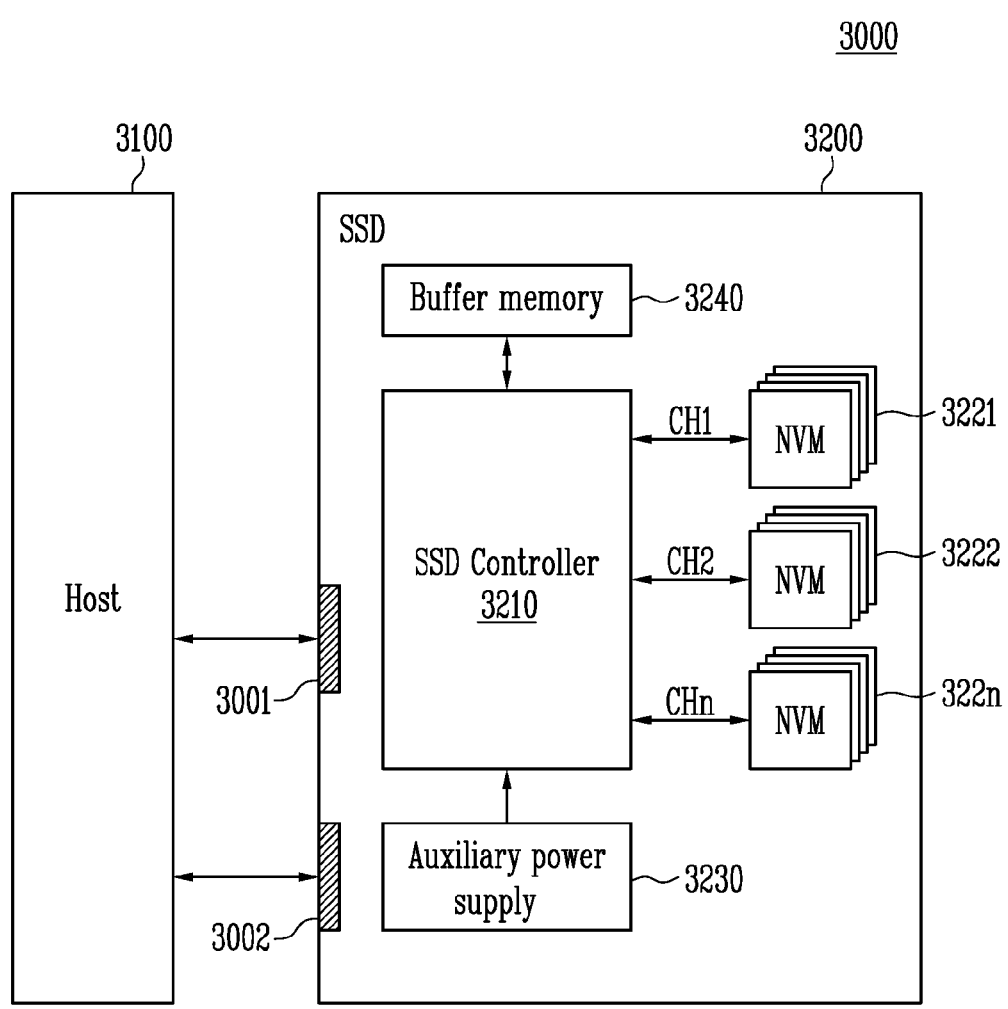
FIG. 18 is a block diagram illustrating a solid state drive (SSD) system to which a storage device according to an embodiment of the present disclosure is applied.

FIG. 18 is a block diagram illustrating a solid state drive (SSD) system to which a storage device according to an embodiment of the present disclosure is applied.

Referring to FIG. 18, the SSD system 3000 includes a host 3100 and an SSD 3200. The SSD 3200 exchanges a signal with the host 3100 through a signal connector 3001 and receives power through a power connector 3002. The SSD 3200 includes an SSD controller 3210, a plurality of flash memories 3221 to 322n, an auxiliary power supply 3230, and a buffer memory 3240.

According to an embodiment of the present disclosure, the SSD controller 3210 may perform the function of the memory controller 200 described with reference to FIG. 1.

The SSD controller 3210 may control the plurality of flash memories 3221 to 322n in response to the signal received from the host 3100. For example, the signal may be signals based on an interface between the host 3100 and the SSD 3200. For example, the signal may be a signal defined by at least one of interfaces such as a universal serial bus (USB), a multimedia card (MMC), an embedded MMC (eMMC), a peripheral component interconnection (PCI), a PCI express (PCI-e or PCIe), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe.

The auxiliary power supply 3230 is connected to the host 3100 through the power connector 3002. The auxiliary power supply 3230 may receive the power from the host 3100 and may charge the power. The auxiliary power supply 3230 may provide power of the SSD 3200 when power supply from the host 3100 is not smooth. For example, the auxiliary power supply 3230 may be positioned in the SSD 3200 or may be positioned outside the SSD 3200. For example, the auxiliary power supply 3230 may be positioned on a main board and may provide auxiliary power to the SSD 3200.

The buffer memory 3240 operates as a buffer memory of the SSD 3200. For example, the buffer memory 3240 may temporarily store data received from the host 3100 or data received from the plurality of flash memories 3221 to 322n, or may temporarily store meta data (for example, a mapping table) of the flash memories 3221 to 322n. The buffer memory 3240 may include a volatile memory such as a DRAM, an SDRAM, a DDR SDRAM, an LPDDR SDRAM, and a GRAM, or a nonvolatile memory such as an FRAM, a ReRAM, an STT-MRAM, and a PRAM.

Figure 19:
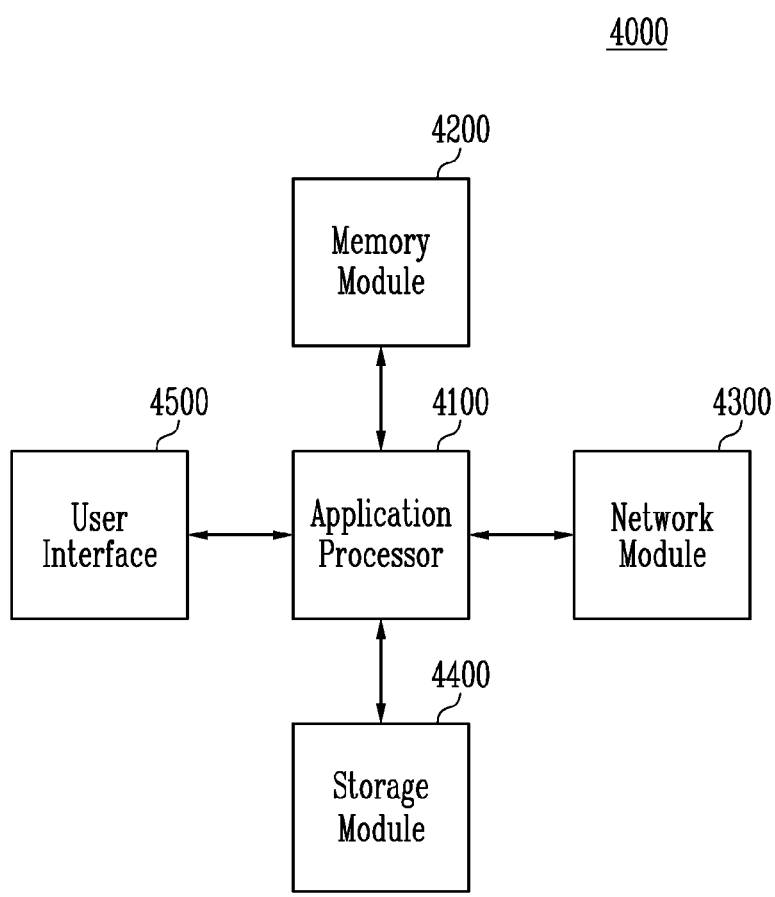
FIG. 19 is a block diagram illustrating a user system to which a storage device according to an embodiment of the present disclosure is applied.

FIG. 19 is a block diagram illustrating a user system to which a storage device according to an embodiment of the present disclosure is applied.

Referring to FIG. 19, the user system 4000 includes an application processor 4100, a memory module 4200, a network module 4300, a storage module 4400, and a user interface 4500.

The application processor 4100 may drive components, an operating system (OS), a user program, or the like included in the user system 4000. For example, the application processor 4100 may include controllers, interfaces, graphics engines, and the like that control the components included in the user system 4000. The application processor 4100 may be provided as a system-on-chip (SoC).

The memory module 4200 may operate as a main memory, an operation memory, a buffer memory, or a cache memory of the user system 4000. The memory module 4200 may include a volatile random access memory such as a DRAM, an SDRAM, a DDR SDRAM, a DDR2 SDRAM, a DDR3 SDRAM, an LPDDR SDRAM, an LPDDR2 SDRAM, and an LPDDR3 SDRAM, or a nonvolatile random access memory, such as a PRAM, a ReRAM, an MRAM, and an FRAM. For example, the application processor 4100 and memory module 4200 may be packaged based on a package on package (POP) and provided as one semiconductor package.

The network module 4300 may communicate with external devices. For example, the network module 4300 may support wireless communication such as code division multiple access (CDMA), global system for mobile communications (GSM), wideband CDMA (WCDMA), CDMA-2000, time division multiple access (TDMA), long term evolution, WiMAX, WLAN, UWB, Bluetooth, and Wi-Fi. For example, the network module 4300 may be included in the application processor 4100.

The storage module 4400 may store data. For example, the storage module 4400 may store data received from the application processor 4100. Alternatively, the storage module 4400 may transmit data stored in the storage module 4400 to the application processor 4100. For example, the storage module 4400 may be implemented with a nonvolatile semiconductor memory element such as a phase-change RAM (PRAM), a magnetic RAM (MRAM), a resistive RAM (RRAM), a NAND flash, a NOR flash, and a three-dimensional NAND flash. For example, the storage module 4400 may be provided as a removable storage device (removable drive), such as a memory card, and an external drive of the user system 4000.

For example, the storage module 4400 may include a plurality of nonvolatile memory devices, and the plurality of nonvolatile memory devices may operate identically to the memory device 100 described with reference to FIG. 1. The storage module 4400 may operate identically to the storage device 50 described with reference to FIG. 1.

The user interface 4500 may include interfaces for inputting data or an instruction to the application processor 4100 or for outputting data to an external device. For example, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric element. The user interface 4500 may include user output interfaces such as a liquid crystal display (LCD), an organic light emitting diode (OLED) display device, an active matrix OLED (AMOLED) display device, an LED, a speaker, and a monitor.

An embodiment of the present disclosure also provides a storage device and a method of operating the same capable of performing a various operation other than the above-described read operation on a plurality of logical addresses. For example, write operation can be performed on a plurality of logical addresses in the same manner as the above-described multi-read operation.

According to an embodiment of the present disclosure, a storage device may include a memory device, and a memory controller configured to receive a write command from an external host and control the memory device according to the write command, wherein the write command may include a basic header segment commonly included in commands transmitted and received between the external host and the memory controller and including information indicating that the write command is a command to request to store data in the memory device, a transaction specific field including information indicating that the write command is a write command for at least two or more logical addresses, and an extra header segment including information on the at least two or more logical addresses.

According to an embodiment of the present disclosure, a method of operating a storage device including a memory device and a memory controller that controls the memory device may include receiving, by the memory controller from an external host, a write command including a basic header segment commonly included in commands transmitted and received between the external host and the memory controller and including information indicating a write command to request to store data in the memory device, a transaction specific field including information indicating that the write command is a write command for at least two or more logical addresses, and an extra header segment including information on the at least two or more logical addresses, and performing a write operation based on the information on the at least two or more logical addresses.

Although various embodiments have been described for illustrative purposes, it will be apparent to those skilled in the art that various changes and modifications may be made without departing from the spirit and scope of the invention as defined in the following claims. Furthermore, the embodiments may be combined to form additional embodiments.

What is claimed is:

1. A storage device comprising:
a memory device; and
a memory controller configured to receive a write command from an external host and control the memory device according to the write command,
wherein the write command comprises:
a basic header segment commonly included in commands transferred between the external host and the memory controller and including information indicating that the write command is a command for requesting to data in the memory device;
a transaction specific field including information indicating that the write command is a write command for at least two or more logical addresses; and
an extra header segment including information on the at least two or more logical addresses.

2. The storage device of claim 1, wherein the information on the at least two or more logical addresses includes information on at least two start logical block addresses and transfer lengths respectively corresponding to the at least two or more start logical block addresses.

3. The storage device of claim 1, wherein the at least two or more logical addresses are not successive with each other.

4. The storage device of claim 1, wherein the transaction specific field includes a write command descriptor block (CDB).

5. The storage device of claim 4, wherein the write CDB includes the information indicating that the write command is the write command for the at least two or more logical addresses.

6. The storage device of claim 5, wherein the information indicating that the write command is the write command for the at least two or more logical addresses is included in a reserved field in the write CDB.

7. The storage device of claim 6, wherein the write CDB further includes operation code field, a force unit access field, and a group number field.

8. The storage device of claim 1, wherein the basic header segment includes a total extra header segment length field indicating a length of the extra header segment.

9. The storage device of claim 8, wherein the total extra header segment length field includes a non-zero value.

10. A method of operating a storage device including a memory device and a memory controller that controls the memory device, the method comprising:
receiving, from an external host, a write command including:
a basic header segment commonly included in commands transferred between the external host and the memory controller and including information indicating that the write command is a command for requesting to store data in the memory device,
a transaction specific field including information indicating that the write command is a write command for at least two or more logical addresses, and
an extra header segment including information on the at least two or more logical addresses; and
performing a write operation based on the information on the at least two or more logical addresses.

11. The method of claim 10, wherein the information on the at least two or more logical addresses includes information on at least two start logical block addresses and transfer lengths respectively corresponding to the at least two or more start logical block addresses.

12. The method of claim 10, wherein the basic header segment includes a total extra header segment length field indicating a length of the extra header segment.

13. The method of claim 12, wherein the total extra header segment length field includes a non-zero value.

14. The method of claim 10, wherein the at least two or more logical addresses are not successive with each other.

15. The method of claim 10, wherein the transaction specific field includes a write command descriptor block (CDB).

16. The method of claim 15, wherein the write CDB includes the information indicating that the write command is the write command for the at least two or more logical addresses.

17. The method of claim 16, wherein the information indicating that the write command is the write command for the at least two or more logical addresses is included in a reserved field in the write CDB.

18. The method of claim 10, further comprising receiving data, from the external host, to be stored in locations corresponding the at least two or more logical addresses.

19. The method of claim 18, wherein the data is stored in the memory device according to an order of logical block address information included in the extra header segment.

20. A memory controller that controls a memory device, the memory controller comprising:
a map data storage configured to store mapping information between a logical address and a physical address of data stored in the memory device;
a request processor configured to receive a write request from an external host and obtain physical addresses corresponding to at least one or more logical addresses included in the write request; and
an operation controller configured to provide the memory device with a command for the physical addresses corresponding to the at least one or more logical addresses to,
wherein the request comprises:
a basic header segment commonly included in requests transmitted and received between the external host and the memory controller and including information indicating that the write request is for requesting to store data in the memory device;

a transaction specific field including information indicating that the write request is a write request for at least two or more logical addresses; and an extra header segment including information on the at least two or more logical addresses.

* * * * *